Dec. 10, 1935.  R. N. AUBLE  2,023,947
RADIOANALYZER
Filed Dec. 28, 1933
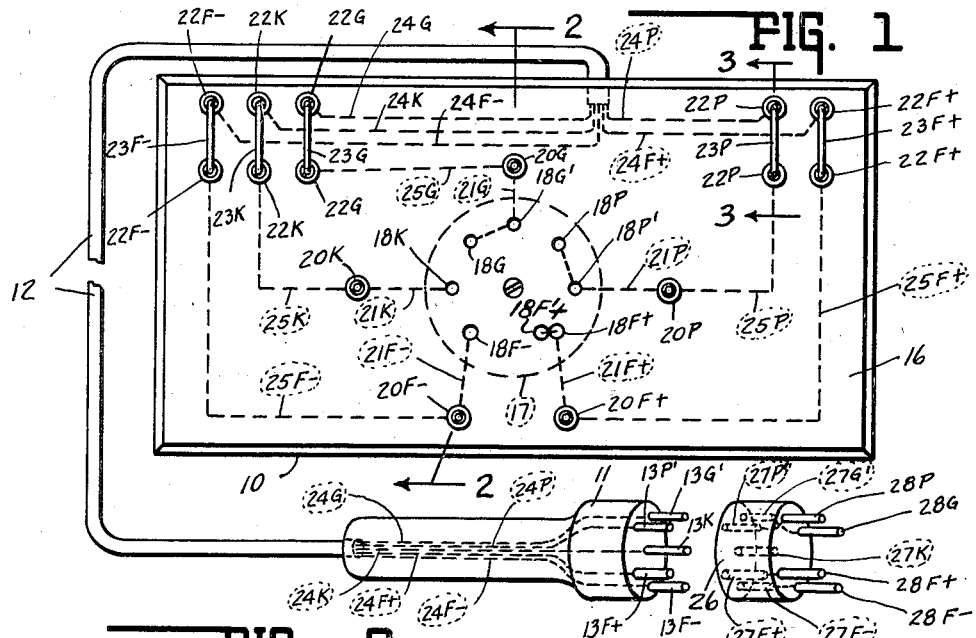
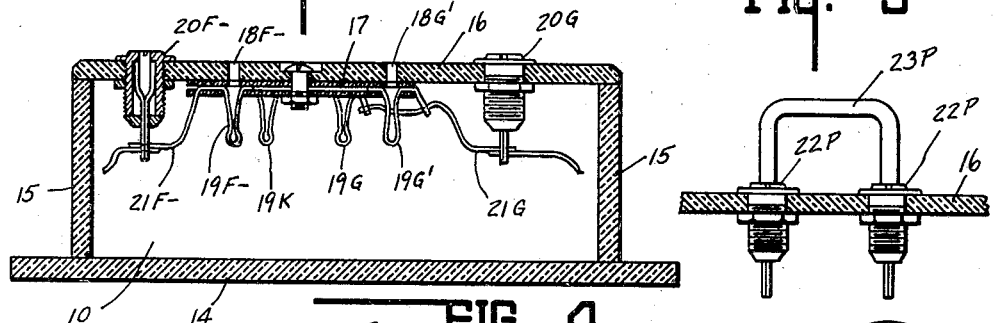
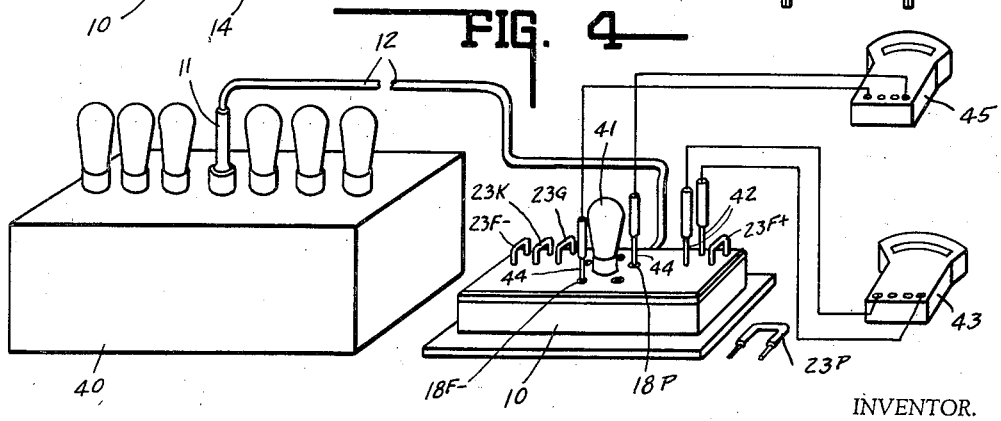
INVENTOR.
ROBERT N. AUBLE.
BY Lockwood Goldsmith & Galt
ATTORNEYS.

Patented Dec. 10, 1935

2,023,947

UNITED STATES PATENT OFFICE 2,023,947

RADIOANALYZER

Robert N. Auble, Indianapolis, Ind., assignor to Weston Electrical Instrument Corporation, Newark, N. J., a corporation Application December 28, 1933, Serial No. 704,235

12 Claims. (Cl. 250—20)

This invention relates to a testing set for analyzing operating conditions in electrical circuits associated with thermionic tubes and is particularly applicable for testing household radio sets and for laboratory experiments thereon.

The principal object of the invention is to provide a simple, compact and convenient unit which may be easily carried in the kit of a radio service man and which provides for the complete testing of each tube circuit of a radio set without disturbing the wiring of the set and without the use of the confusing array of electrical switches heretofore used for the connection of meters for the necessary current and voltage readings. The testing set is provided with a socket for the reception of the tube whose circuit is to be tested and a plug to be inserted in the socket of the radio set from which the tube has been removed. It is also provided with convenient meter terminals preferably in the form of jacks for the reception of test prongs attached to the meters used for the determination of the voltages and currents associated with the tube. The tube socket and jacks are conveniently mounted on a single base while the plug is connected thereto by a multiple conductor cord of convenient length. During a test the tube continues to function as a part of its constituent radio set but the operating conditions of its circuit may be accurately determined without the necessity of breaking connections within the radio set to determine current readings, without the necessity of probing within the radio set to measure the voltages associated with the tube, and without any complicated switching arrangement in the testing set itself.

Other objects and features of the invention will be understood from the accompanying drawing and the following description and claims:

Fig. 1 is a plan view of a preferred form of the invention. Fig. 2 is a sectional view taken on the line 2—2 of Fig. 1. Fig. 3 is a partial sectional view taken on the line 3—3 of Fig. 1. Fig. 4 is a perspective view of the testing set in operation.

The principal parts of the testing set comprise the unit proper 10, a plug 11 and a cable or cord connection 12 between the two. The plug 11 is provided with terminal prongs 13F—, 13F+, 13G′, 13P′ and 13K arranged to be inserted in one of the standard types of thermionic tube sockets.

The unit proper as herein illustrated consists of a box having a bottom 14, side walls 15 and a cover plate 16. The cover plate 16 is of insulating material and forms a base for the electrical apparatus associated with the unit proper. To the undersurface of the base 16 there is fastened a thermionic tube socket 17. Openings 18K, 18G, 18P, etc. are provided in the base 16 for the reception of the prongs of a thermionic tube. Beneath each of said openings there is a contact member or jack 19K, 19G, 19G′, etc. which makes yielding electrical contact with the prongs of the tube in the well known manner. In the embodiment of the invention shown herein, the socket 17 is provided with eight of these jacks and the base plate 16 is provided with a corresponding number of openings 18. In Fig. 1 the openings 18F—, 18F+, 18P and 18G are provided for the negative and positive filament prongs, the plate prong and the grid prong respectively of the four-terminal tube. In addition, there are provided openings 18F′+, 18P′, 18G′ and 18K for one heater prong and the plate, grid and cathode prongs of the five-terminal tube. The opening 18F— in this arrangement is properly placed for the second heater prong of the five-terminal tube. Thus, either the five-prong or four-prong tube may be inserted in the socket.

Surrounding the tube socket there are fastened to the base 16 several meter terminals 20F—, 20F+, 20P, 20G and 20K which are preferably jacks of the standard form illustrated in Fig. 2. These jacks are connected by conductors 21F—, 21F+, 21P, 21G and 21K respectively to the tube jacks 19F—, 19F+, 19P′, 19G′ and 19K. Conductors 21P and 21G also extend to tube jacks 19P and 19G and conductor 21F+ extends to tube jack 18F′+.

There are also provided on the base 16 a group of similar jacks arranged in pairs 22F—, 22F+, 22P, 22G and 22K. U-shaped jumpers 23F—, 23F+, 23P, 23G and 23K are inserted in the corresponding pairs of jacks and normally provide electrical connections between them. The prongs 13F—, 13F+, 13P′, 13G′ and 13K of the plug 11 are electrically connected by conductors 24F—, 24F+, 24P, 24G and 24K to one of the jacks of the corresponding pairs 22F—, 22F+, etc. The opposite jacks in each pair are connected by conductors 25F—, 25F+, etc. to the corresponding jacks of the 20 series.

By means of this arrangement there is a jack of the 20 series directly connected to each element of the tube while a pair of the jacks of the 22 series is connected in series between each element of the tube and the corresponding prong of the plug 11. To measure the voltages between any two elements of a five-terminal tube it is only necessary to remove the tube from the radio set, insert it in the socket 17, insert the plug 11 in the socket from which the tube has been removed and insert the test prongs of a voltmeter in the proper jacks of the 20 series. To measure the current passing to or from any element of the tube the proper jumper of the 23 series is removed from its jacks and the test prongs of an ammeter are inserted therein.

In Fig. 4 the testing set is illustrated as arranged for the testing of the circuits of a radio set 40. In this arrangement one of the tubes 41 of the radio set has been removed from its socket and the plug 11 has been inserted therein. The tube 41 has been inserted in the socket of the testing unit proper. The jumper 23P for the plate circuit of the tube has been removed from its corresponding jacks 22P and the test prongs 42 of a milliammeter 43 have been inserted in said jacks. Similarly, the test prongs 44 of a voltmeter 45 have been inserted in the jacks 20F— and 20P. The tube continues to function as a part of the radio set 40 at the same time that its plate current is measured by the milliammeter 43 and the plate voltage is measured by the voltmeter 45. No complicated switching has been performed, the result being attained by the simplest manipulation of the test prongs and jumper.

When it is desired to test a four-terminal tube there is attached to the plug 11 an adapter 26 having sockets numbered in the 27 series and corresponding to the prongs of the 13 series. The adapter 26 is provided with prongs 28F—, 28F+, 28P and 28G properly spaced to fit the jacks of a standard four-terminal tube socket. The said prongs are electrically connected to the sockets 27F—, 27F+, 27P' and 27G' respectively and are thus electrically connected to the corresponding jacks of the socket 17. The socket 27K has no electrical connection since it is not needed for the four-terminal tube.

The foregoing specification describes one form of the invention but it is appreciated that many variations may be made therein without departing from the invention as defined in the appended claims. For example, it is not necessary that the jacks 19 be assembled on a socket 17 as described herein. They may be individually attached to the base 16 and the term "tube socket" as used in the claims is intended to include such a construction. Similarly, the invention is not limited to the use of four and five-terminal tubes, as illustrated herein. The socket 17 may be adapted for any and all of the standard tubes in common use, or individual sockets for the several types of tubes may be mounted on the base 16. The plug 11 is then provided with prongs for the tube having the largest number of terminals to be used and suitable adapters similar to that described are provided for tubes having a lesser number of terminals. It is also possible and desirable in some cases to mount the meters within the box of the unit proper, thus forming a completely self contained testing unit. It is also possible to eliminate the jumper connection between the pairs of terminals 22 by the use of standard two terminal jacks in which the two terminals are normally in contact but are separated by the insertion of a two terminal test prong connected to the ammeter. The term "separable connection" as used in the claims is intended to include such a construction.

The invention claimed is:

1. In testing apparatus, a transfer unit comprising a tube socket, a plug having prongs of the design and number adapted to be received in said socket, circuit connections between the prongs of said plug and the corresponding terminals of said socket, and means in a plurality of said circuit connections for detachably receiving the terminal leads of a measuring instrument.

2. In testing apparatus, a transfer unit comprising a tube socket, a plug having prongs of the design and number adapted to be received in said socket, circuit connections between the prongs of said plug and the corresponding terminals of said socket, and means for introducing a current measuring instrument into certain of said circuit connections; said means in each circuit connection comprising a pair of terminal-receiving members and a displaceable member normally connecting said terminal-receiving members in series in the associated circuit connection, said terminal-receiving members being adapted to receive the terminal leads of a current measuring instrument.

3. The invention as claimed in claim 2, wherein an additional terminal-receiving means is included in each of said certain circuit connections.

4. A testing set including a base, a socket for a thermionic tube mounted thereon, jacks for the reception of meter test prongs mounted on said base, a plug having terminals insertable in a thermionic tube socket, and conductors connecting corresponding terminals of said first mentioned tube socket and said plug and connecting each of said jacks to one of said socket terminals.

5. A testing set including a base, a socket for a thermionic tube mounted thereon, a pair of jacks for the reception of meter test prongs mounted on said base, a plug having terminals insertable in a thermionic tube socket, conductors connecting one terminal of said plug to one of said jacks and connecting the corresponding terminal of said first mentioned socket to the other of said jacks, a removable jumper insertable in said jacks for electrically connecting the same, and other conductors connecting other terminals of said plug to corresponding terminals of said first mentioned socket.

6. A testing set including a base, a socket for a thermionic tube mounted thereon, a group of jacks for the reception of meter test prongs mounted on said base, a plug having terminals insertable in a thermionic tube socket, conductors connecting said jacks to corresponding terminals of said first mentioned socket, a pair of other jacks mounted on said base, conductors connecting a terminal of said plug to one of said pair of jacks and connecting the other of said pair to the corresponding terminal of said first mentioned socket, a removable jumper insertable in said pair of jacks for electrically connecting the same, and other conductors connecting other terminals of said plug to corresponding terminals of said first mentioned socket.

7. A testing set including a thermionic tube socket, a pair of meter terminals adapted for convenient contact with meter connections, a plug having terminals insertable in a thermionic tube socket, conductors connecting one terminal of said plug to one of said meter connections and connecting the other of said meter connections to the corresponding terminal of said first mentioned tube socket, a removable jumper connecting said meter terminals, and other conductors connecting other terminals of said plug to corresponding terminals of said first mentioned socket.

8. A testing set including a plug having terminal prongs insertable in a thermionic tube socket; a self contained unit including a thermionic tube socket and a number of meter terminals; and a cable connection between said plug and said unit; certain of said meter terminals being separably connected in pairs in series between corresponding terminals of said plug and said second mentioned tube socket.

9. A testing set including a plug having terminal prongs insertable in a thermionic tube socket; a self contained unit including a thermionic tube socket and a number of meter terminals; and a cable connection between said plug and said unit; certain of said meter terminals consisting of jacks for reception of meter test prongs arranged in pairs having a removable jumper connection, each pair being connected in series between corresponding terminals of said plug and said second mentioned tube socket.

10. A testing set including a plug having terminal prongs insertable in a thermionic tube socket; a self contained unit including a thermionic tube socket and a number of meter terminals; and a cable connection between said plug and said unit; each terminal prong of said plug being connected to a corresponding terminal of said second mentioned tube socket and certain of said meter terminals comprising jacks for reception of meter test prongs, each electrically connected to one of the terminals of said second mentioned tube socket.

11. In testing apparatus, a transfer unit for establishing circuit connections between a tube socket of a radio receiver and a measuring instrument, said unit comprising a base member including a tube socket, a plug having prongs of the same number and design as those of a tube which may be received in said socket, leads connected to the plug prongs and forming a cable terminating in said base member, a plurality of pin jacks carried by said base member, and a connection including at least one pin jack between each cable lead and a terminal of said socket.

12. In testing apparatus, a transfer unit comprising a tube socket, a plug having prongs of the design adapted to be received in said socket, and circuit connections between the prongs of said plug and the corresponding terminals of said socket, each of said circuit connections including a pin jack adapted to receive pin terminals for establishing connections to a measuring instrument.

ROBERT N. AUBLE.